United States Patent
Bethune et al.

(10) Patent No.: US 8,793,352 B2
(45) Date of Patent: *Jul. 29, 2014

(54) STORAGE AREA NETWORK CONFIGURATION

(75) Inventors: Iain A. Bethune, Selkirk (GB); Gordon D. Hutchison, Eastleigh (GB); Bruce J. Smith, Westbourne (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,688

(22) Filed: Jun. 14, 2012

(65) Prior Publication Data

US 2012/0254378 A1    Oct. 4, 2012

Related U.S. Application Data

(63) Continuation of application No. 12/999,223, filed as application No. PCT/EP2009/057917 on Jun. 24, 2009.

(51) Int. Cl.
  *G06F 15/177* (2006.01)
(52) U.S. Cl.
  USPC .............................. 709/220; 709/221; 712/15
(58) Field of Classification Search
  USPC ...................... 709/221, 228; 712/15; 713/100
  See application file for complete search history.

(56) References Cited

U.S. PATENT DOCUMENTS

| | | | |
|---|---|---|---|
| 6,601,187 B1 | 7/2003 | Sicola et al. | |
| 7,499,410 B2 | 3/2009 | Dutt et al. | |
| 2003/0142628 A1 | 7/2003 | Alonso et al. | |
| 2003/0187945 A1 | 10/2003 | Lubbers et al. | |
| 2006/0004918 A1 | 1/2006 | Lubeck et al. | |
| 2006/0034181 A1 | 2/2006 | Noguchi et al. | |
| 2007/0002883 A1 | 1/2007 | Edsall et al. | |
| 2007/0130295 A1 | 6/2007 | Rastogi et al. | |
| 2008/0256323 A1 | 10/2008 | Mopur et al. | |
| 2009/0017803 A1* | 1/2009 | Brillhart et al. | ............ 455/414.2 |
| 2009/0083423 A1 | 3/2009 | Basham et al. | |
| 2009/0089462 A1 | 4/2009 | Strutt | |
| 2009/0245242 A1* | 10/2009 | Carlson et al. | ................ 370/386 |
| 2009/0327459 A1 | 12/2009 | Yoo et al. | |
| 2009/0327481 A1 | 12/2009 | Rickard et al. | |

FOREIGN PATENT DOCUMENTS

| | | |
|---|---|---|
| CN | 1902578 A | 1/2007 |
| JP | 2002278909 A | 9/2002 |

* cited by examiner

*Primary Examiner* — Abdullah Riyami
*Assistant Examiner* — Brian Cox
(74) *Attorney, Agent, or Firm* — Griffiths & Seaton PLLC

(57) ABSTRACT

For storage area network configuration across redundant fabrics, a set of redundant fabrics is defined. A fabric is a network between devices of a storage area network. A first fabric communicates with the other fabrics in a set of redundant fabrics to send configuration information. Each redundant fabric examines the first fabric's configuration information for devices to which the redundant fabric is also connected and resolves ports for devices to which the first fabric and the redundant fabric are connected to provide ports on the redundant fabric equivalent to the ports on the first fabric.

18 Claims, 8 Drawing Sheets

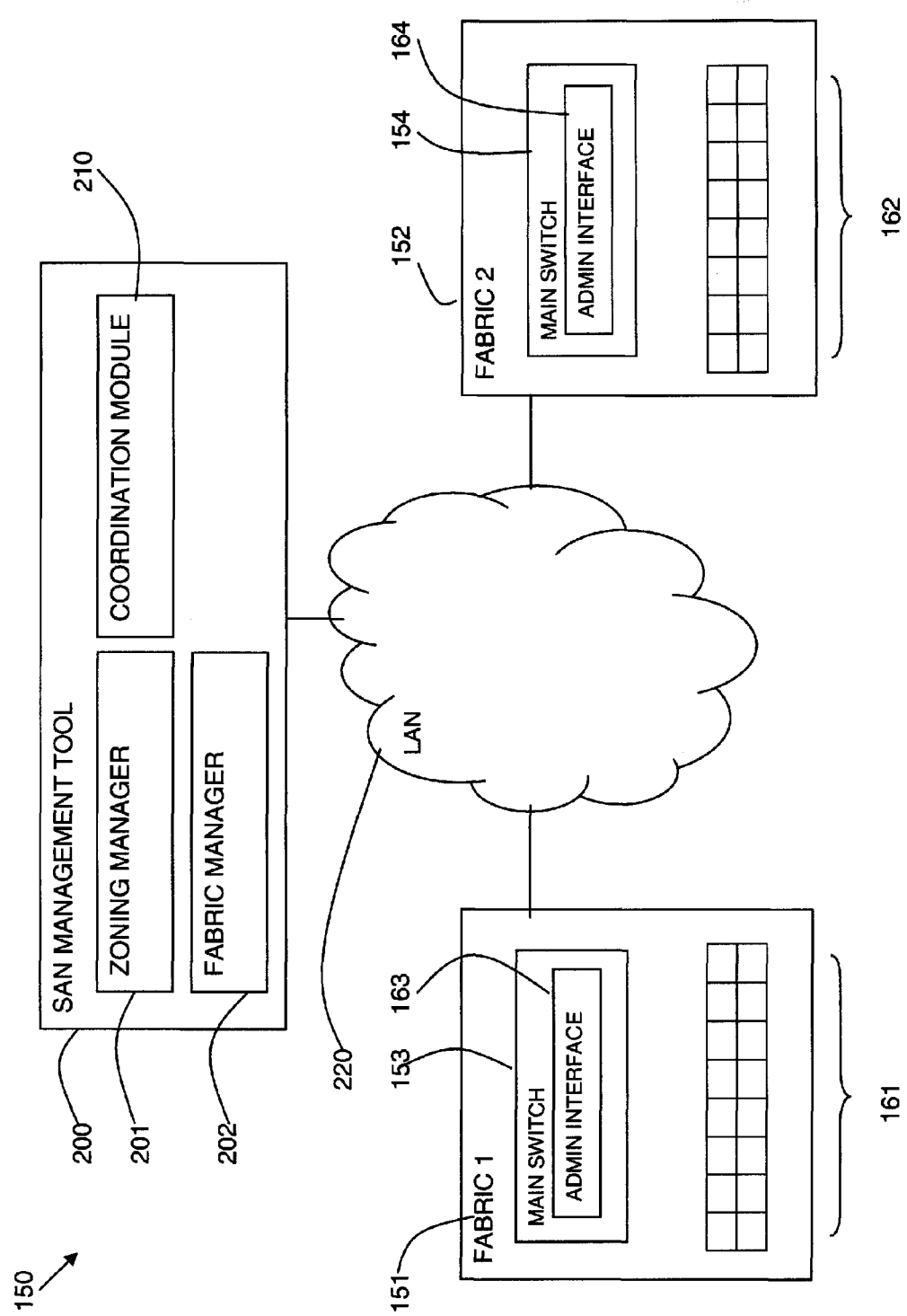

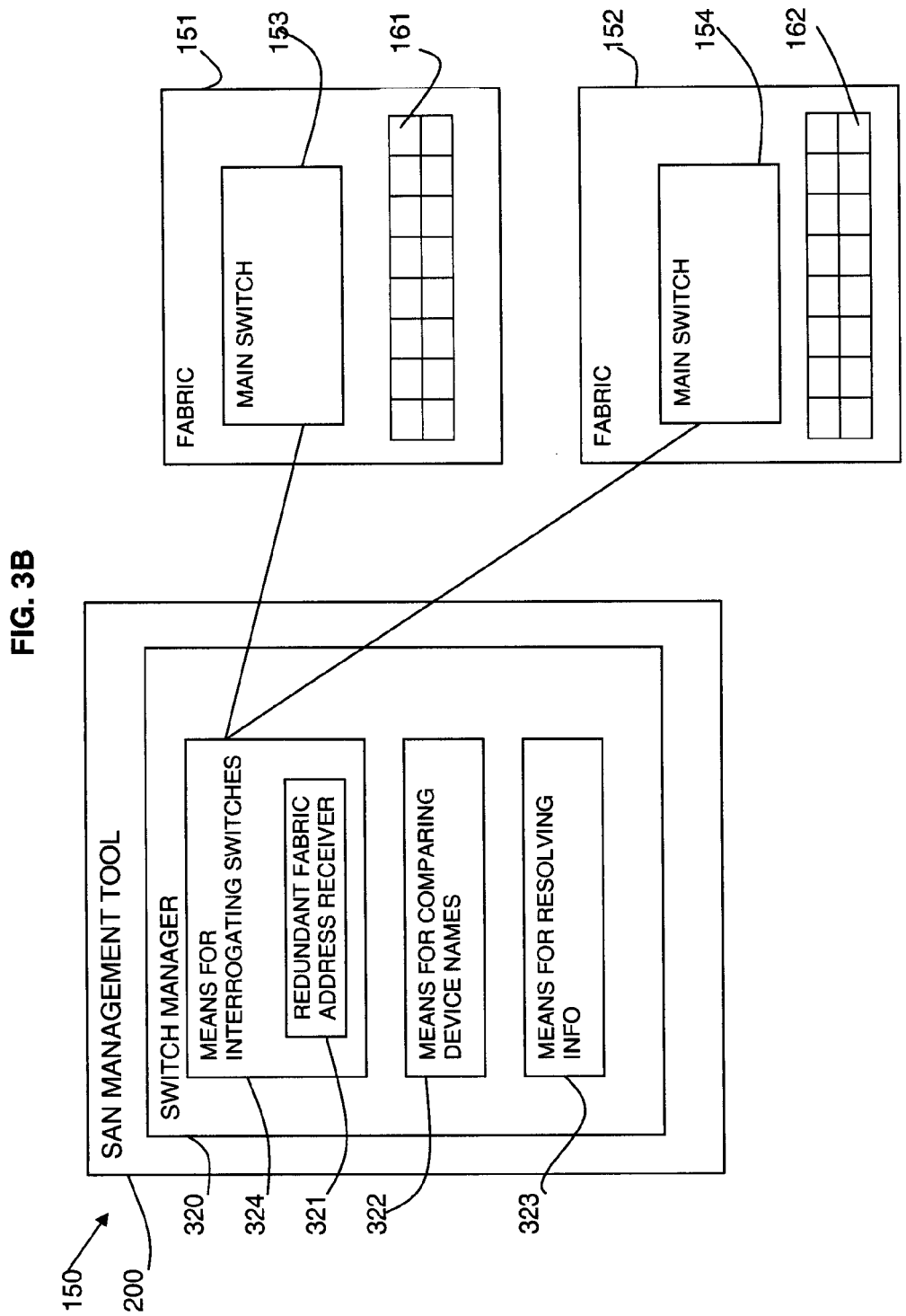

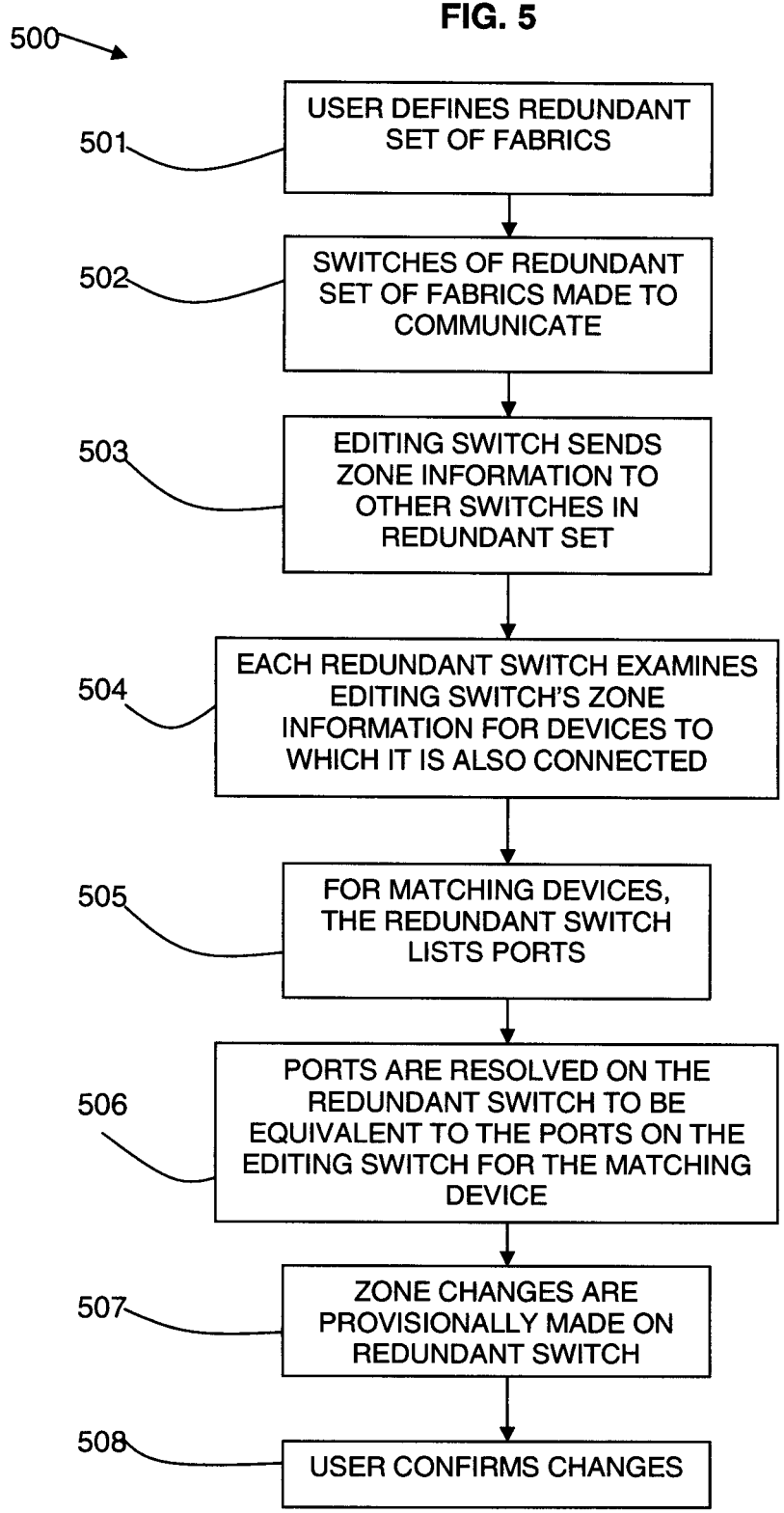

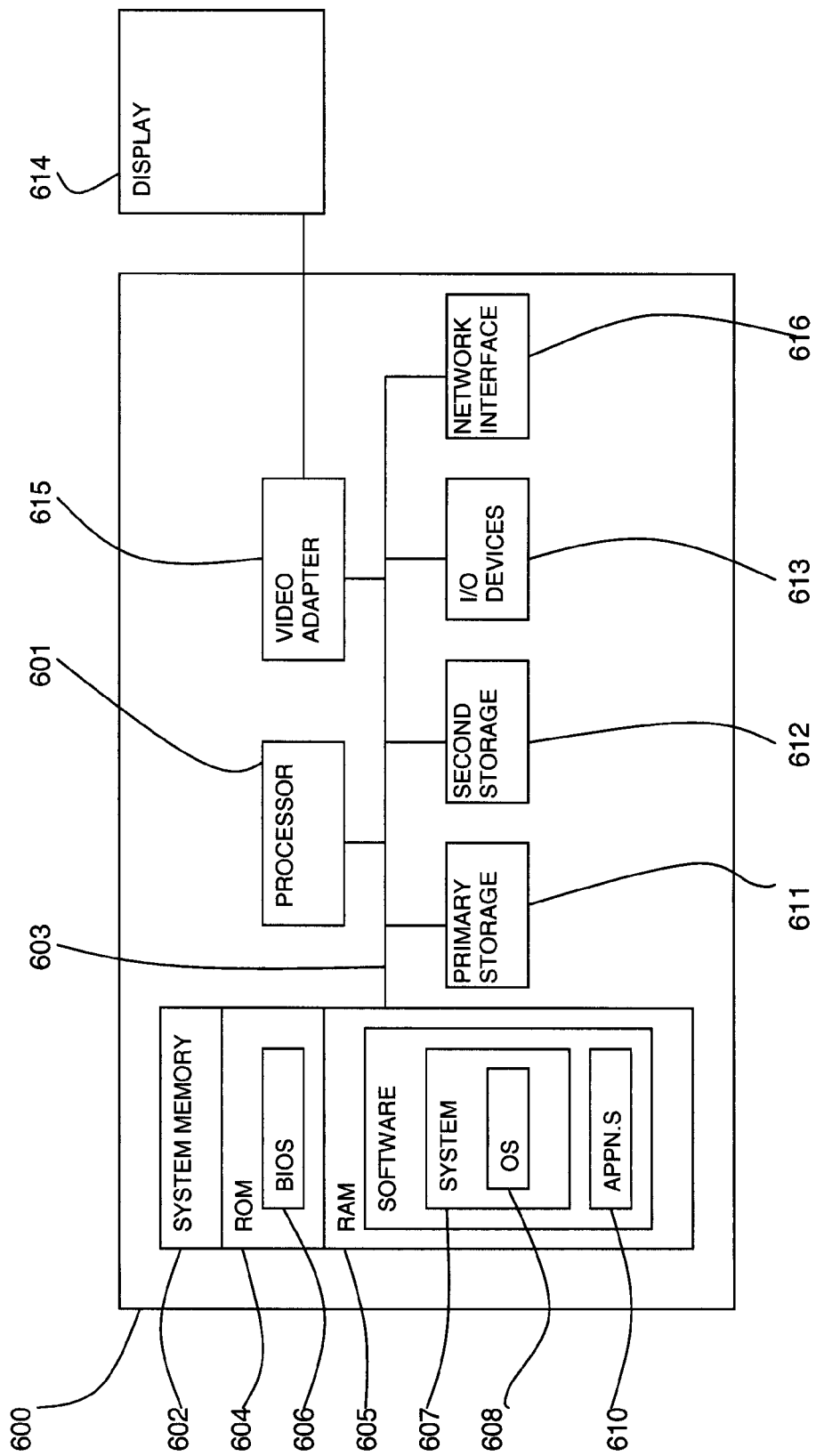

STORAGE AREA NETWORK CONFIGURATION

CROSS-REFERENCE TO RELATED APPLICATIONS

This application is a Continuation of U.S. application Ser. No. 12/999,223 filed Dec. 15, 2010, which is a U.S. National Stage entry under 35 U.S.C §371 based on International Application No. PCT/EP2009/057917 filed Jun. 24, 2009, which was published under PCT Article 21(2) and which claims priority to European Patent Application No. 08159418.6 filed Jul. 1, 2008.

BACKGROUND OF THE INVENTION

1. Field of the Invention

This invention relates to the field of storage area networks (SAN). In particular, the invention relates to configuration between redundant fabrics in a SAN.

2. Description of the Related Art

A SAN is an architecture in which remote computer storage devices are attached to servers (hosts) in such a way that, to the operating system of the host, the storage devices appear as locally attached storage.

When designing a SAN, often there will be two or four distinct "fabrics" which provide connectivity between host devices and storage devices. Here, a "fabric" is a given set of fibre channel switches and cables that form the network between the SAN devices. The multiple fabrics provide redundancy as there are multiple connections between each device which reduces the likelihood of loss of connectivity due to hardware failure or cable breakage on the SAN. Typically, each device on the SAN will be connected to at least two fabrics. Importantly, each fabric will usually connect the same set of devices, in the same pattern of zones—the redundant fabrics are symmetric.

By introducing redundant fabrics, the SAN administrator's workload has also multiplied, since a zoning configuration change to one fabric will also need to be made on all the redundant fabrics. This task is error-prone, as the administrator must ensure that they zone the correct ports on each fabric so that each has the same logical configuration i.e. it connects the same set of devices.

When setting up a fabric, an administrator will typically configure one fabric and then have to do an equal amount of work to configure the other one(s) in a similar, but symmetrically different way.

Customers are building large SANs with 1000 or 2000 ports. Managing these types of redundant fabrics is difficult as it involves having to create and validate zoning configurations. Making a mistake in the zoning configuration is likely to lead to an application I/O error on one or more servers when subsequent SAN maintenance is carried out.

SUMMARY OF THE INVENTION

According to a first aspect of the present invention there is provided a method for storage area network configuration, comprising: defining a set of redundant fabrics, wherein a fabric is a network between devices of a storage area network; a first fabric communicating with the other fabrics in a set of redundant fabrics to send configuration information; each redundant fabric examining the first fabric's configuration information for devices to which the redundant fabric is also connected; and resolving ports for devices to which the first fabric and the redundant fabric are connected to provide ports on the redundant fabric equivalent to the ports on the first fabric.

The method may include receiving user confirmation of the configuration changes to a redundant fabric.

A first fabric may communicate with the other fabrics via the internet using the internet protocol name of the main switches of the other fabrics. Alternatively, a first fabric may communicate with the other fabrics by interrogation via a switch manager.

Each redundant fabric may examine the first fabric's configuration information for devices to which the redundant fabric is also connected uses the device's World Wide Node Names (WWNN) to identify common devices.

Resolving ports for devices may include defining a port by a label identifying devices to which it is connected, wherein the same label is provided on different fabrics for equivalent ports. The label may map the WWNN that a port is part of and WWNNs it is connected to.

The configuration information may be a zone change in the first fabric, and the method may include: the first fabric identifying devices and ports that are being added or removed from a zone in a fabric-abstract manner; and each redundant fabric modifying zones to add or remove the ports that correspond to the change on the first fabric. The method may further include: identifying the set of devices in the zone before the change; and finding a zone on the redundant fabric that contains the same set of devices.

The configuration information may add a new zone, and the method may include: the first fabric identifying devices and ports in the new zone; finding redundant fabrics containing ports that belong to the identified devices; and each redundant fabric creating an equivalent zone containing ports that correspond to each device in the new zone.

The configuration information may duplicate a set of zones onto a new redundant fabric, and the method may include: the first fabric creating a list of zones with devices defined in each zone; the new redundant fabric determining for each port in the new redundant fabric which device it belongs to; and the new redundant fabric creating zones containing ports which belong to the same set of devices as are in the zones in the first fabric.

According to a second aspect of the present invention there is provided a computer program product stored on a computer readable storage medium for storage area network configuration, comprising computer readable program code means for performing the steps of: defining a set of redundant fabrics, wherein a fabric is a network between devices of a storage area network; a first fabric communicating with the other fabrics in a set of redundant fabrics to send configuration information; each redundant fabric examining the first fabric's configuration information for devices to which the redundant fabric is also connected; and resolving ports for devices to which the first fabric and the redundant fabric are connected to provide ports on the redundant fabric equivalent to the ports on the first fabric.

According to a third aspect of the present invention there is provided a method of providing a service to a customer over a network, the service comprising: defining a set of redundant fabrics, wherein a fabric is a network between devices of a storage area network; a first fabric communicating with the other fabrics in a set of redundant fabrics to send configuration information; each redundant fabric examining the first fabric's configuration information for devices to which the redundant fabric is also connected; and resolving ports for devices to which the first fabric and the redundant fabric are connected to provide ports on the redundant fabric equivalent to the ports on the first fabric.

According to a fourth aspect of the present invention there is provided a storage area network, comprising: at least two fabrics forming a redundant set of fabrics, wherein a fabric is a network between host devices and storage devices; means for communication between the fabrics of a redundant set configuration information; means for examining a first fabric's configuration information for devices to which a redundant fabric is also connected; and means for resolving ports for devices to which the first fabric and the redundant fabric are connected to provide ports on the redundant fabric equivalent to the ports on the first fabric.

The means for communication between the fabrics may be via the internet using the internet protocol name of the main switches of the fabrics. Alternatively, the storage area network may include a switch manager with fabric interrogation means for providing communication between fabrics.

The storage area network may include a storage area network management tool for managing configuration of the fabrics via a network, including means for configuration of redundant fabrics.

In a symmetric redundant pair (or quad, etc) of fabrics in a switched SAN, a facility is provided to permit a switch to communicate its fabric configuration to a partner switch on initial configuration and on configuration change. A symmetric initial fabric configuration or fabric configuration change is provided for the fabric controlled by the partner switch.

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2 is a block diagram of a storage area network with a management tool in accordance with the present invention;

FIG. 3B is a second embodiment of a storage area network in accordance with an aspect of the present invention;

FIG. 5 is a flow diagram of a method in accordance with the present invention; and FIG. 6 is a block diagram of a computer system in which the present invention may be implemented.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
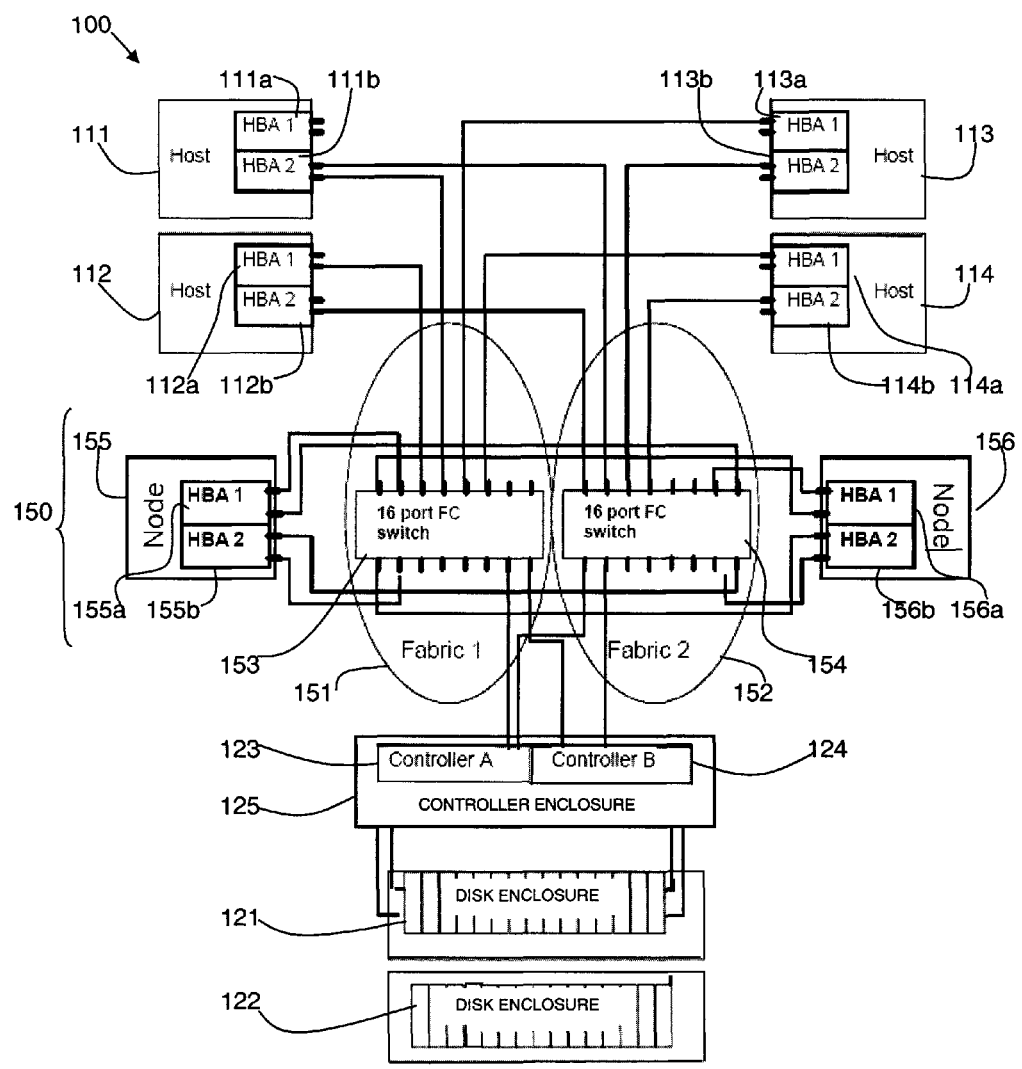
FIG. 1 is a block diagram showing an example of a storage area network.

Referring to FIG. 1, an example of a SAN architecture 100 is shown. The SAN architecture 100 includes multiple host devices 111-114 connected to storage arrays 121-122 of storage devices via a SAN 150. The storage arrays 121-122 have storage controllers 123-124 within a controller enclosure 125. Storage arrays 121-122 typically comprise a plurality of magnetic disk storage devices, but could also include or consist of other types of mass storage devices.

The SAN 150 in the example of FIG. 1 is a dual fabric as it includes two fibre channel switch fabrics 151-152. Other common SANs include four fabrics as a quadruple fabric. Each fabric 151-152 has a master switch 153-154 which has multiple ports (in this example, 16 ports on each switch). A fabric 151, 152 is an abstract model of the connected ports that have connectivity using fibre channel traffic. A fabric 151, 152 usually has a master switch 153, 154 used for configuration. Sometimes there will be more than one switch but they are usually configured via a master switch.

In the described embodiment the two fabrics' switches 153-154 are connected to (and thus via) the Ethernet. The switches have internet access and therefore make the fabrics' 151, 152 configurations controllable from elsewhere on the internet.

A node 155, 156 is usually part of two (or four) fabrics 151, 152. A node is data source or destination connected via one or more fabric. A port in a node 155, 156 will be in only one fabric 151, 152 but most nodes 155, 156 have 2 or 4 ports which are usually on 2 or 4 separate fabrics 151, 152.

A host bus adapter (HBA) connects devices within the architecture and is a Fibre Channel interface card. Fibre Channel HBAs are available for all major open systems, computer architectures, and buses. Each HBA has a unique World Wide Name (WWN) which is 8 bytes long. There are two types of WWNs on a HBA; a node WWN (WWNN), which is shared by all ports on a host bus adapter, and a port WWN (WWPN), which is unique to each port.

In FIG. 1, the host devices 111-114 each have two HBAs 111a, 111b, 112a, 112b, 113a, 113b, 114a, 114b. The nodes 155, 156 of the SAN 150 also have two HBAs each, 155a, 155b, 156a, 156b.

FIG. 1 shows a SAN 150 with two fabrics 151-152, so that one of the fabrics is redundant. Other SAN architectures have multiple-fabrics such as quadruple fabrics providing more redundancy.

The described method makes use of the property that a physical device (application host or storage device) connected to a multiple-fabric SAN will have multiple ports with distinct World Wide Port Names (WWPNs) but they may share a common World Wide Node Name (WWNN). This WWNN is given by the device on "fabric login" to the fabric.

So for example a host may have a WWNN of 123456789987654321 and two ports with IDs 1234567890002468 and 1234567890001357. When it is connected to a switch with a port to port link the switch will know both the WWNN and WWPN that is connected on that port.

A node should have the same WWNN even from multiple HBAs. However, the solution for this is vendor specific so this is not always implemented if, for example, one were to mix HBA cards from different vendors on the same host. Nonetheless, for the purposes of this description it is assumed that the user has done whatever the HBA vendor recommends in order to report a single WWNN for the host with multiple HBAs. This may be to get all the HBAs from one vendor (e.g. HBAs report the WWNN from the card in the lowest slot or the vendors device driver arbitrates) or the use of a supplied firmware configuration utility etc.

Even in the rare case where the different ports on a device do not share the same WWNN, this can be overcome by defining a set of ports as making up a single device.

In storage networking, fibre channel zoning is the partitioning of a fibre channel fabric into smaller subsets to restrict interference, add security, and to simplify management. If a SAN contains several storage devices, each system connected to the SAN should not be allowed to interact with all of them. Zoning is implemented on switches and each port can be a member of multiple zones.

Referring to FIG. 2, a block diagram shows a SAN 150 with two fabrics 151, 152 each with multiple ports 161, 162 and a main switch 153, 154. The main switch 153, 154 in each fabric 151, 152 has a switch administration interface 163, 164.

Fabrics 151, 152 are connected to a LAN 220 via Ethernet for connecting to other components in the SAN 150 and may also have internet connectivity.

A SAN management tool 200 is provided in communication with the fabrics 151, 152. SAN management tools 200 are provided in known SAN architectures to provide a zoning manager 201 and a fabric manager 202. A known SAN management tool 200 may be provided as a Web based service via a command console which is served from a fabric switch (for example, http://myswitch_ip_address). Another known form of SAN management tool 200 may be provided as a software application for running on a personal computer for more complicated administrative tasks. As the fabrics' switches have Ethernet/internet connectivity the SAN management tool 200 can be provided on any machine connected to the internet.

The SAN management tool 200 is extended to include the described zoning change coordination module 210.

When a SAN administrator makes a zoning change to one fabric 151, the coordination module 210 will identify which devices WWNNs (rather than WWPNs) the change applies to, and then inform the other partner fabric(s) via Ethernet of the change at a WWNN level.

Additionally, some SANs will have two or more ports from a single WWNN connected to a single fabric (e.g. for SAN Volume Controllers (SVCs)). So it is not clear if a port is changed on one fabric which one of the ports this applies to on the other fabric.

The solution is that a port can be easily labelled with all the other WWNNs it is zoned into (via the WWPNs it is zoned to) and where this differentiates the ports from a single WWNN. This, due to the symmetry usually present, can be used to identify the equivalent port in the other fabric. Where this WWNN connectivity does not differentiate two ports from a single WWNN then, by definition, which ones to associate as pairs/quads will make no logical difference from a zoning perspective. In such cases, the ports may be paired based on order or sequence of WWPN or on the similarity of alias etc. The method of pairing does not matter, as long as further zone changes, once the ports are differentiated, use the 'equivalent' port.

Also, when the user does confirm the pairings of equivalent ports, if an override is necessary to the automatically offered pairing (for example, due to some other external factor), the port equivalence need only be entered or selected once, with subsequent changes being automated using the entered equivalence.

Two steps are required to establish the required relationships. In the first step, the user defines which fabrics are related to each other as a redundant set by means of identifying the controlling switch of each fabric. In the second step, information is resolved about the WWNN/devices that relate to the WWPN ports plugged into the fabric and these are used to pair up (or quadruple up, etc.) ports it has with ports in the other fabric.

Figure 3A:
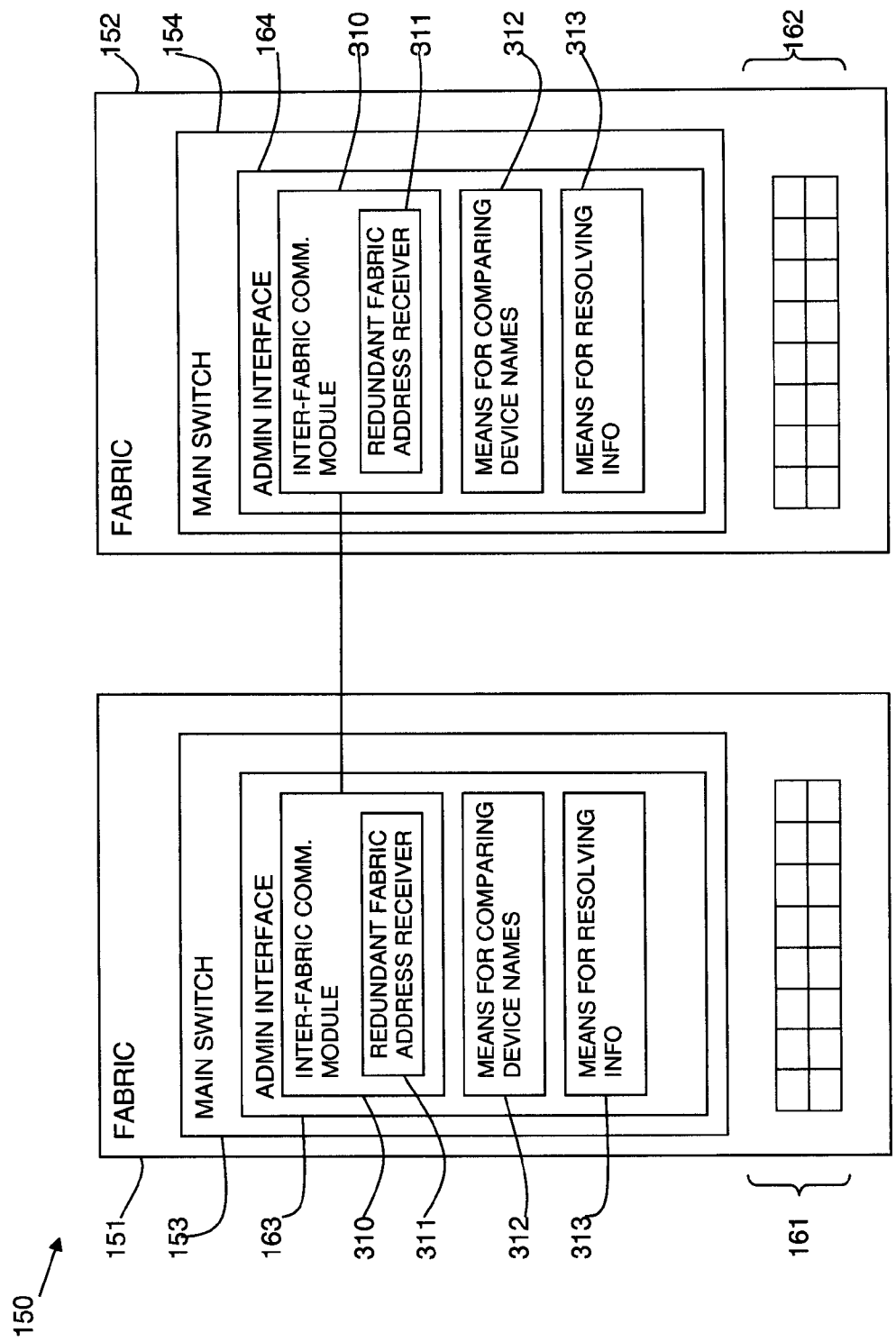
FIG. 3A is a first embodiment of a storage area network in accordance with an aspect of the present invention.

Two embodiments are provided for implementation of these steps. The two embodiments are shown in FIGS. 3A and 3B. In the first embodiment shown in FIG. 3A, the main switches of the fabrics communicate with other fabrics. In the second embodiment shown in FIG. 3B, a single switch manager is provided, for example as part of the SAN management tool 200 shown in FIG. 2.

FIG. 3A shows two fabrics 151, 152 of a SAN 150. Each fabric 151, 152 has a main switch 153, 154 with an administrative interface 163, 164 and multiple ports 161, 162. The administrative interface 163, 164 of a fabric 151, 152 includes an inter-fabric communication module 310 with a redundant fabric address receiver 311 which receives addresses of paired/quadrupled fabrics input by a user. The administrative interface 163, 164 also includes means for comparing device names 312 of the fabrics and means for resolving 313 the information about device names and how they relate to the port names of a fabric 151, 152.

FIG. 3B shows two fabrics 151, 152 of a SAN 150 each with main switches 153, 154 and multiple ports 161, 162. Each fabric 151, 152 has a switch manager 320 provided as a central administrative console in the form of an enterprise. In one implementation, the switch manager 320 may be provided as part of the SAN management tool 200 of FIG. 2. The switch manager 320 includes a redundant fabric address receiver 321 which receives addresses of paired/quadrupled fabrics input by a user and a means for interrogating 324 all switches 153, 154 in order to pair/quadruple up fabrics 151, 152. The switch manager 320 also includes means for comparing device names 322 of the fabrics and means for resolving 323 the information about device names and how they relate to the port names of a fabric 151, 152.

Referring to FIG. 3A and FIG. 3B, in the first step the user defines (to the switch 153, 154 in FIG. 3A or to the switch manager 320 in FIG. 3B) which fabrics 151, 152 are related to each other as a redundant set. This is received by the redundant fabric address receivers 311, 321.

The user supplies the set of fabrics (typically 2 or 4) that are to be redundant. This will usually be in the form of the Internet Protocol (IP) address of a switch in each fabric.

In the embodiment of FIG. 3A, this may be by entering the Domain Name System (DNS) name of a partner fabric's main switch 154 in the administration interface 163 of a switch 153. The switches 153, 154 can then begin to talk to each other about the fabric configurations that each of them is in control of. This can be automated as long as the switches of the same "set" can talk to each other they can discover partner fabrics with devices with WWNNs that are present in their own set of WWNNs.

The information would generally go from the switch that had had a configuration change to the other fabric's or fabrics' main switch. There is no 'dominant' fabric between redundant fabric pairs (quads)—the symmetry required for failover makes this sensible and previously, they have usually had no knowledge of each other at all.

In the embodiment of FIG. 3B, the switches 153, 154 are interrogated to pair up ones with overlapping sets of WWNNs.

In the second step, each fabric main switch 153, 154 in the first embodiment or the switch manager 320 in the second embodiment, automatically resolves information about the WWNN devices that relate to the WWPN ports plugged into the fabric and uses these to pair up (or quadruple up etc.) ports it has with ports in the other fabric.

In the unusual case of there being multiple ports with the same WWNN which are zoned in different ways on two redundant fabrics, the problem is referred to the user to resolve.

Figure 4A:
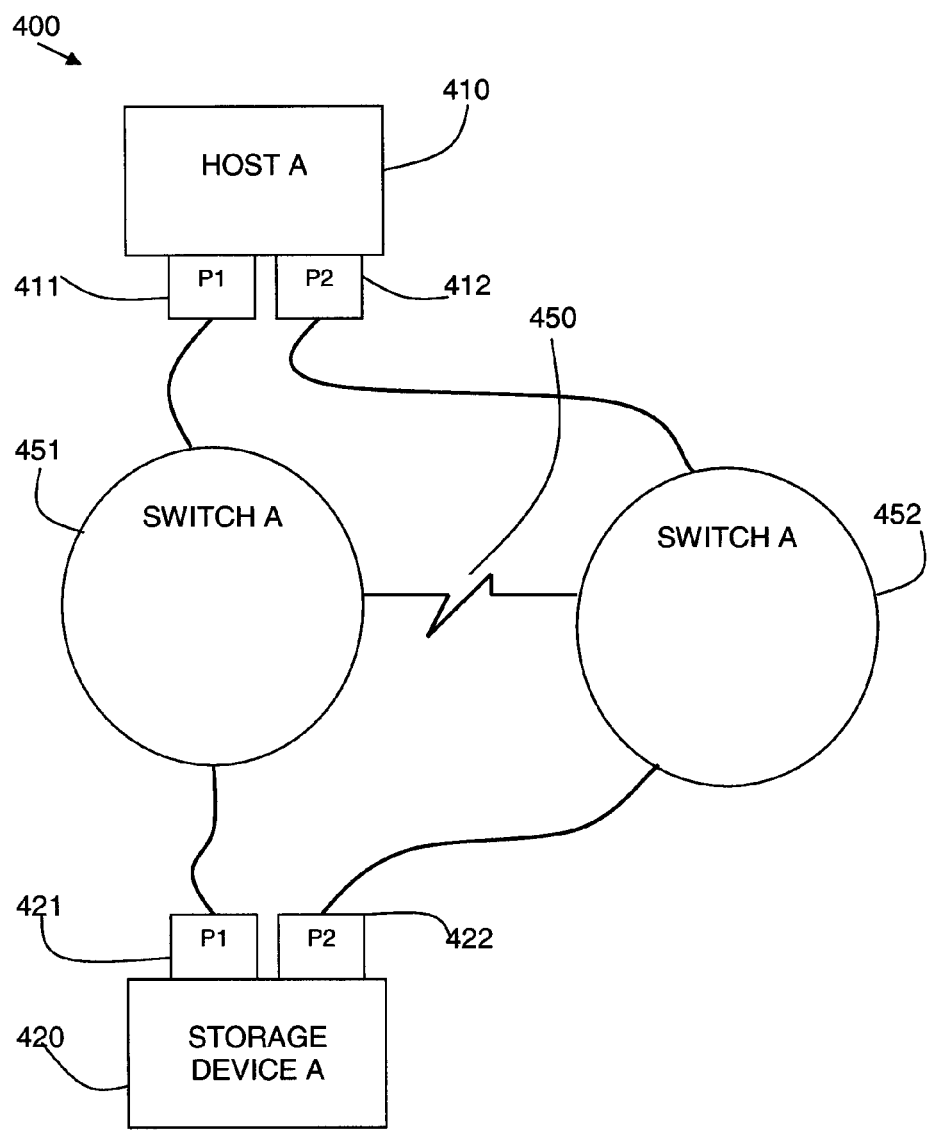
FIG. 4A is a schematic representation of a first example storage area network configuration in accordance with an aspect of the present invention.
Figure 4B:
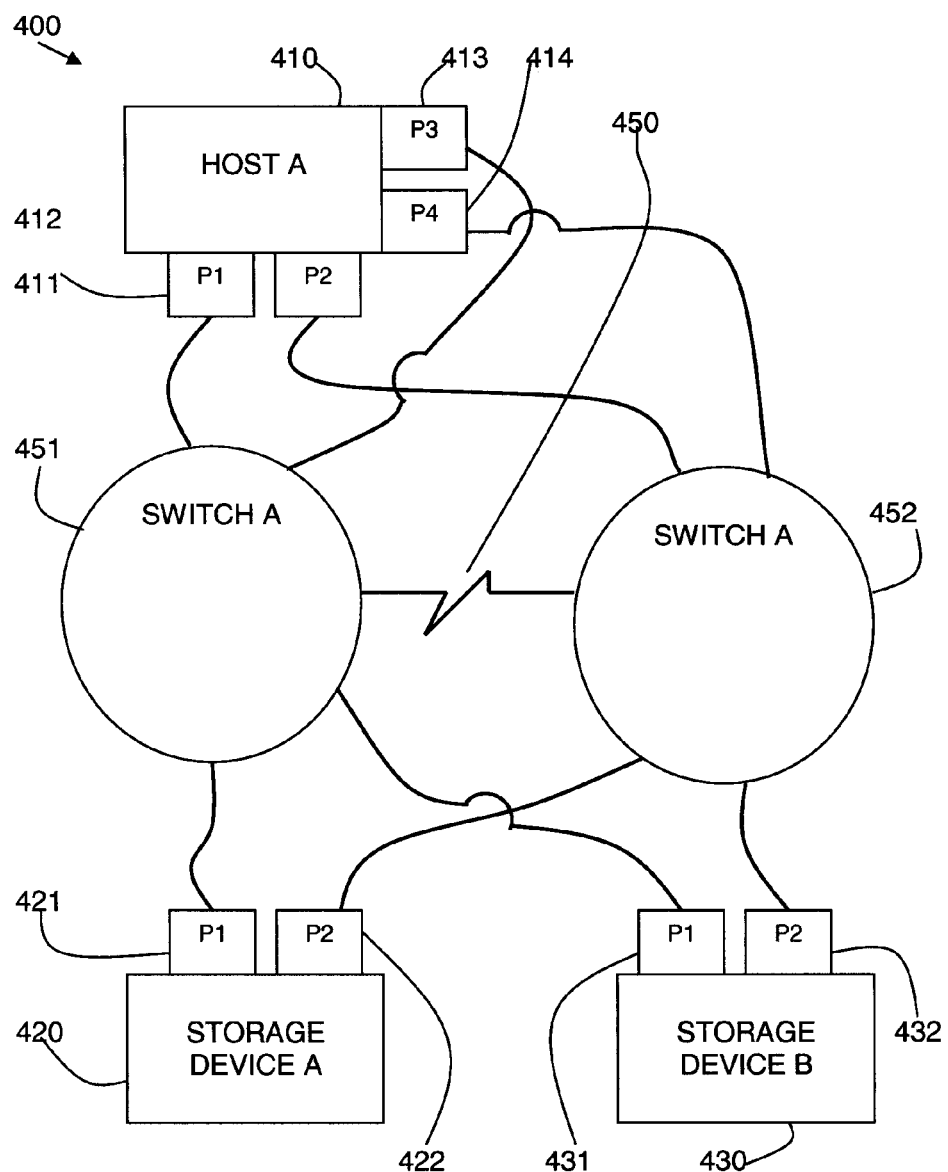
FIG. 4B is a schematic representation of a second example storage area network configuration in accordance with an aspect of the present invention.

Two worked examples are provided with reference to FIGS. 4A and 4B to show the described method and system in further detail.

FIG. 4A shows a simple case with a SAN 400 with a Host A 410 with two ports P1 411, P2 412 connected to a Storage Device A 420 with two ports P1 421, P2 422 via two fabrics, Switch A 451 and Switch B 452. The two fabrics 451, 452 provide redundancy and communicate via the internet 450.

Switch A 451 is designated by a user to a "Zone A", with user specified ports as: {Host A:P1, Storage Device A:P1}. To configure Switch B 452 to Zone A, "Zone A", "Host A" and "Storage Device A" are copied directly. Port P2 412 on Host A 410 and port P2 422 on Storage Device A 420 are the only logical possibilities as they are the only visible ports for the devices. This provides the configuration for Switch B 452 of "Zone A" as {Host A:P2, Storage Device A:P2}.

FIG. 4B shows a more complex case with the addition of a second Storage Device B 430 with two ports P1 431, P2 432. In addition, the Host A 410 has two further ports P3 213, P4 214.

Switch A 451 is configured for the change to "Zone A" as {Host A:P1, Storage Device A:P1, Storage Device B:P1, Host A:P3}. Storage Device B has been added and is shown underlined.

Switch A 451 tells Switch B 452 about the zone change. Switch B 452 sees "Storage Device B:P2" as a new port that is not zoned to anything and sees that on Switch A 451, the user connected (zoned) Storage Device B 430 to both possible ports, so it generates Zone A: {Host A:P2, Host A:P4, Storage Device A:P2, Storage Device B:P2}.

This method can be summarised as the following steps:
a. Tell Switch A to partner with Switch B.
b. Tell Switch B to accept/partner with Switch A.
c. Switches exchange zone information and a switch will examine its partner's zone for WWNNs (devices) that are also connected to it. The information will generally go from the switch that had a configuration change to the other fabric's or fabrics' main switch.
d. For matching WWNNs (devices), a list of the ports WWPNs on each switch/fabric is made:

| 1. WWNN (Switch A) | | WWNN' (Switch B) |
|---|---|---|
| a. P1 | equivalent | P1' |
| b. P2 | equivalent | P2' |
| c. P3 | equivalent | P3' |
| P4 | equivalent | P4' |

Ports P1 and P1' are equivalent if they are in the same WWNN, are zoned to "see" the same set of WWNNs via equivalent ports. If they are ports on the same machine (both "node" and "WWNN" would be synonymous) and are allowed to communicate with the same set of other machines and if the ports that they are connected to on the other machines are also 'equivalent.'

Thus, a change in one side can be reflected in the other. So, if P2 is added to zone {P1, P4}, then P2' can be added to zone {P1', P4'}.

Referring to FIG. 5 a flow diagram 500 shows the described method. A user defines 501 a redundant set of fabrics. There may be two, four or another even multiple of fabrics in the set depending on the redundancy required. The switches of the redundant set of fabrics are made to communicate 502, either directly or via another entity. An editing switch which has had changes made or new zones added sends 503 zone information to the other switches in the redundant set.

Each redundant switch in the redundant set examines 504 the editing switch's zone information for devices (WWNNs) to which it is also connected. For matching devices, the redundant switch lists ports 505. The ports are resolved 506 on the redundant switch to be equivalent to the ports on the editing switch.

The zone changes are provisionally made 507 on the redundant switch and may be confirmed 508 by a user.

In the fibre channel standard, a device will present its WWNN on fabric login "FLOGI". The layout of a WWPN (64 bits) is defined by the IEEE but it will always contain an OUI (Organizationally Unique Identifier) and a vendor-defined unique ID. Examples of WWPNs which map to the same WWNN are:
Qlogic HBA:
210000E08B0510D4
210100E08B2510D4
Emulex HBA:
10000000C93035AE
10000000C93035AF
IBM DS4000:
200500A0B8165695
200400A0B8165695
IBM SVC:
500507680140029B
500507680130029B
500507680110029B
500507680120029B (QLogic is a trade mark of QLogic Corporation, Emulex is a trade mark of Emulex Corporation, and IBM is a trade mark of International Business Machines Corporation.)

The 'alias' of the port is also likely to have some aspect of the machine name in it and some other port differentiating scheme, for example, "SVC1-P1", "SVC1-P2" etc. This information can be used to as a hint to match up equivalent WWPNs in cases where there is more than one port from a single WWNN in each fabric's switch.

A scheme is provided that maps the set of WWNNs/nodes/machines that a port is part of and those it is connected to to some form of label. The scheme depends only on the WWNNs not on the individual port and will thus give the same label on different fabrics for equivalent ports and thus be a means to identify equivalent ports.

In one example, WWNNs are ordered by numeric order and for a 'bitset' of flags are used to label each WWPN.

For example, there is a list of devices with WWNNs {500507680140029A, 500507680140029B, 500507680140029C} in numerical order. A WWPN zoned to the first device of WWNN 500507680140029A would have a bitset number of "100" as it matches the first WWNN in the list and not the next two WWNNs. This would be in binary the value 4. A WWPN zoned to the first and last devices in the list (i.e. WWNN 500507680140029A and WWNN 500507680140029C) would have a bitset number of "101" i.e. in binary the value 5.

This provides a distinguishing label for a WWPN—its "WWNN+bitsetvalue" that can be shared across switches and will be the same in each of the redundant fabrics once they are zoned/set up if they contain the same set of WWNNs.

The bit set is a sub-part of the port's label that will be the same for equivalent ports on different fabrics. So a node may have 4 ports which will have labels like:
  a. P1: "N1-101"
  b. P2: "N1-101"
  c. P3: "N1-010"
  d. P4: "N1-010"
where P1 and P3 are on fabric A and P2 and P4 are on fabric B. The switches can then see an equivalence P1 to P2 and P3 to P4 as they have the same calculated label—even though both calculated the label independently based on the WWNN in their fabric.

An equivalent that is robust when there is a slightly different set (such as concatenating the WWNNs in numerical order for a WWPN) can also be devised.

For example, the stated method had an array of bits with each column representing a WWNN and a 1 in that column representing "connectivity to the WWNN". The equivalent would be to concatenate in alphabetical (hexadecimal numeric) order all the connected WWNNS. So instead of "N1-0101" there would be a label such as:

"N1-500507680140029A:500507680140029C" (where the bits were for 0001 for (500507680140029)A, 0010 for (500507680140029)B, 0100 for (500507680140029)C, 1000 for (500507680140029)D.

When a partner/subordinate switch is not yet zoned at all, the ports from a particular WWNN are undistinguished and when more than one is present from one WWNN they can initially be selected by a convention or by looking at the alias etc.

The system makes a list of WWPNs:WWNNs visible on each fabric. From these it constructs sets of ports across the redundant fabrics (pairs, quads, etc.) where each set is of equivalent WWPNs with the same WWNN.

There are a number of applications of the system which apply this information when making a zone change on a redundant fabric. It can be seen that these are all expressions of the same basic algorithm:

A small zone change:
  a. For the zone being changed
    1. Identify the set of devices in that zone before the change.
  b. Find the zones on the redundant fabrics that contain the exactly the same set of devices.
  c. Identify the ports/devices that are being added/removed from the zone as a result of the changes and identify these in the fabric-abstract manner.
  d. Communicate the nature of the change as expressed in this fabric abstract manner (together with all the fabric-abstract identification information of the WWPNs and WWNNs involved to the subordinate switch(es)/fabric(s)) using the IP/ethernet link.
  e. These subordinate switches tentatively modify the zones on the redundant fabric(s) to add/remove the WWPNs on each fabric that correspond to the change on the master (edited) fabric in the same way.
  f. Allow the user to check/confirm the changes.

Adding a new zone into a redundant fabric
  a. Identify the set of devices and ports in the new zone.
  b. Find all partner/redundant fabrics containing WWPNs that belong to the set of devices.
  c. Create an equivalent zone on each of the subordinate fabrics containing the equivalent WWPNs that correspond to the each device WWNN in the new user-create zone.

Duplicating a set of zones onto a new redundant fabric
  a. Create a list of zones (sets of devices) on the original fabric.
  b. For each WWPN on the new fabric, work out which device it belongs to.
  c. On the new fabric, create zones containing WWPNs which belong to the same devices as are in the zones on the original fabric.

The proposed method and system exploits SAN symmetry to speed up configuration by having one switch talk to another and copy the first configuration change using WWNN to join to the other WWPNs across the Ethernet.

This reduces the administrator's workload and reduces the risk of unintended errors by taking the changes made to one fabric as a model and making the equivalent changes across the other fabrics automatically or at least after confirmation by the user. Relevant fabric changes could be the initial setup of the fabric or deltas to an existing fabric configuration.

The fibre channel switch, for example the main switch in a fabric, can be given the IP name of its equivalent switch(es) and talks to it over Ethernet about configuration changes that have been made by the user. These changes will be visible and available for 'auto-complete' when the user next logs in to the partner switch on the other fabric.

In the described example the user need only configure one switch and then tell that switch the IP name of its partner switch. When the user logs onto the partner switch it has already resolved that the devices that it has attached are to be zoned in a similar manner to the way they are zoned in the other switch. The user need only confirm that this is what is wanted thus saving time and completing the task in a manner that is more likely to be error free. If there were an error in the original configuration this will not be masked by correct wiring in this fabric.

Referring to FIG. 6, an exemplary system for implementing a SAN management tool includes a data processing system 600 suitable for storing and/or executing program code including at least one processor 601 coupled directly or indirectly to memory elements through a bus system 603. The memory elements can include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. System software 607 may be stored in RAM 605 including operating system software 608. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 can be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for storage area network configuration, comprising:
    defining a set of redundant fabrics wherein a fabric is a network between devices of a storage area network, each device having a world wide node name (WWNN);
    a first fabric communicating with other fabrics in a set of redundant fabrics to send configuration information;
    each redundant fabric examining the configuration information of the first fabric for devices to which the redundant fabric is also connected; and
    resolving ports for devices to which the first fabric and the redundant fabric are connected to provide ports on the redundant fabric equivalent to the ports on the first fabric, the resolving being performed by:
        numerically ordering the WWNNs of the devices,
        assigning a bitset value to each port of each of the devices, after the numerical ordering, such that the same bitset value is assigned to equivalent ports on different fabrics, and
        matching the bitset values of the equivalent ports.

2. A method as claimed in claim 1, including receiving user confirmation of configuration changes to a redundant fabric.

3. A method as claimed in claim 1, wherein the first fabric communicates with the other fabrics via the internet using an internet protocol name of main switches of the other fabrics.

4. A method as claimed in claim 1, wherein the first fabric communicates with the other fabrics by interrogation via a switch manager.

5. A method as claimed in claim 1, wherein each redundant fabric examining the configuration information of the first fabric to which the redundant fabric is also connected uses the World Wide Node Names (WWNN) associated with the devices to identify common devices.

6. A method as claimed in claim 1, wherein the configuration information is a zone change in the first fabric, and the method includes:
    the first fabric identifying devices and ports that are being added or removed from a zone in a fabric-abstract manner; and
    each redundant fabric modifying zones to add or remove the ports that correspond to the zone change on the first fabric.

7. A method as claimed in claim 6, including:
    identifying the set of devices in the zone before the zone change; and
    finding a zone on the redundant fabric that contains the set of devices.

8. A method as claimed in claim 1, wherein the configuration information adds a new zone, and the method includes:
    the first fabric identifying devices and ports in the new zone;
    finding redundant fabrics containing ports that belong to the identified devices; and
    each redundant fabric creating an equivalent zone containing ports that correspond to each device in the new zone.

9. A method as claimed in claim 1, wherein the configuration information duplicates a set of zones onto a new redundant fabric, and the method includes:
    the first fabric creating a list of zones with devices defined in each zone;
    the new redundant fabric determining for each port in the new redundant fabric which device it belongs to; and
    the new redundant fabric creating zones containing ports which belong to the same set of devices as are in the zones in the first fabric.

10. A computer program product stored on a non-transitory computer readable storage medium for storage area network configuration, comprising computer readable program code means for performing the steps of:
    defining a set of redundant fabrics, wherein a fabric is a network between devices of a storage area network;
    a first fabric communicating with the other fabrics in a set of redundant fabrics to send configuration information;
    each redundant fabric examining the configuration information of the first fabric for ports on devices to which the redundant fabric is also connected;
    resolving information relating to the ports for devices to which the first fabric and the redundant fabric are connected, each redundant fabric including devices having ports;

using aliases of the ports of the devices of the first fabric and the redundant fabrics for matching up equivalent ports;

matching up each port of the devices of the first fabric with an equivalent port of the devices of the redundant fabric, wherein matching ports of the devices have matching world wide node names and matching assigned bitset values, in response to the first fabric communicating with the other fabrics to send configuration information; and listing the matched devices of the first fabric and the redundant fabric and indicating the matched ports for each of the matched devices.

11. A method of providing a service to a customer over a network, the service comprising:

defining a set of redundant fabrics, wherein a fabric is a network between devices of a storage area network;

a first fabric communicating with the other fabrics in a set of redundant fabrics to send configuration information;

each redundant fabric examining the configuration information of the first fabric for ports on devices to which the redundant fabric is also connected;

resolving information relating to the ports for devices to which the first fabric and the redundant fabric are connected, each redundant fabric including devices having ports;

using aliases of the ports of the devices of the first fabric and the redundant fabrics for matching up equivalent ports;

matching up each port of the devices of the first fabric with an equivalent port of the devices of the redundant fabric, wherein matching ports of the devices have matching world wide node names and matching assigned bitset values, in response to the first fabric communicating with the other fabrics to send configuration information; and listing the matched devices of the first fabric and the redundant fabric and indicating the matched ports for each of the matched devices.

12. The method of claim 11, further comprising:

changing a zoning of one of the ports on the devices in the first fabric from a first zone to a second zone; and in response to the changing, adding a matched port in the redundant fabric corresponding to the one of the ports on the devices in the first fabric to the second zone.

13. The method of claim 11, wherein the resolving and matching includes pairing up ports from the first fabric with the equivalent ports in the redundant fabrics.

14. The method of claim 11, wherein the resolving and matching includes quadrupling up ports from the first fabric with the equivalent ports in the redundant fabrics.

15. A storage area network, comprising:

at least two fabrics forming a redundant set of fabrics, wherein a fabric is a network between host devices and storage devices;

means for communication between the fabrics of a redundant set configuration information;

means for examining configuration information of a first fabric for ports on devices to which a redundant fabric is also connected;

means for resolving information relating to the ports for devices to which the first fabric and the redundant fabric are connected, each redundant fabric including devices having ports;

means for using aliases of the ports of the devices of the first fabric and the redundant fabrics for matching up equivalent ports;

matching up each port of the devices of the first fabric with an equivalent port of the devices of the redundant fabric, wherein matching ports of the devices have matching world wide node names and matching assigned bitset values, in response to the first fabric communicating with the other fabrics to send configuration information; and means for listing the matched devices of the first fabric and the redundant fabric and indicating the matched ports for each of the matched devices.

16. A storage area network as claimed in claim 15, wherein the means for communication between the fabrics is via the internet using an internet protocol name of main switches of the fabrics.

17. A storage area network as claimed in claim 15, including a switch manager with fabric interrogation means for providing communication between fabrics.

18. A storage area network as claimed in claim 15, including a storage area network management tool for managing configuration of the fabrics via a network, including means for configuration of redundant fabrics.

* * * * *